(12) United States Patent
Lee et al.

(10) Patent No.: US 11,539,800 B2
(45) Date of Patent: Dec. 27, 2022

(54) ELECTRONIC DEVICE AND CONTROL METHOD THEREFOR

(71) Applicant: SAMSUNG ELECTRONICS CO., LTD., Suwon-si (KR)

(72) Inventors: Tae-hoon Lee, Seoul (KR); Young-hyun Kim, Suwon-si (KR); Young-in Park, Suwon-si (KR); Han-jin Park, Suwon-si (KR); Sung-min Lim, Suwon-si (KR); Chang-won Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 16/962,291

(22) PCT Filed: Aug. 29, 2018

(86) PCT No.: PCT/KR2018/009964
§ 371 (c)(1),
(2) Date: Jul. 15, 2020

(87) PCT Pub. No.: WO2019/146864
PCT Pub. Date: Aug. 1, 2019

(65) Prior Publication Data
US 2020/0344308 A1 Oct. 29, 2020

(30) Foreign Application Priority Data

Jan. 23, 2018 (KR) .......................... 10-2018-0008064

(51) Int. Cl.
*G06F 15/173* (2006.01)
*H04L 67/146* (2022.01)
(Continued)

(52) U.S. Cl.
CPC .......... *H04L 67/146* (2013.01); *G06F 3/0482* (2013.01); *G06F 3/0483* (2013.01);
(Continued)

(58) Field of Classification Search
None
See application file for complete search history.

(56) References Cited

U.S. PATENT DOCUMENTS 6,041,360 A * 3/2000 Himmel .............. G06F 16/9562
707/999.001
7,720,836 B2 5/2010 Abajian et al.
(Continued)

FOREIGN PATENT DOCUMENTS

JP        4723836 B2     7/2011
JP     2012-222504 A    11/2012
(Continued)

OTHER PUBLICATIONS

International Search Report, PCT/ISA/210, dated Dec. 12, 2018, in corresponding International Patent Application No. PCT/KR2018/009964.
(Continued)

*Primary Examiner* — Phuoc H Nguyen
(74) *Attorney, Agent, or Firm* — Staas & Halsey LLP

(57) ABSTRACT

Disclosed is an electronic device. The electronic device of the present invention comprises: a communication unit; a storage unit for storing a uniform resource locator (URL) designated by an external electronic device and information on specific content provided in the designated URL; and a processor which, when a request for a connection to a designated URL is received from an external electronic device through the communication unit, identifies whether specific content can be provided in the designated URL, and in a case where the specific content cannot be provided,
(Continued)

obtains information on another URL that provides content related to the specific content by using stored information, and transmits the obtained information on the another URL to the external electronic device through the communication unit.

4 Claims, 13 Drawing Sheets

(51) Int. Cl.
| | |
|---|---|
| *G06F 16/953* | (2019.01) |
| *G06F 16/955* | (2019.01) |
| *G06F 3/0482* | (2013.01) |
| *G06F 3/0483* | (2013.01) |
| *H04L 67/02* | (2022.01) |

(52) U.S. Cl.
CPC ........ *G06F 16/953* (2019.01); *G06F 16/9566* (2019.01); *H04L 67/02* (2013.01)

(56) References Cited

U.S. PATENT DOCUMENTS

| | | | | |
|---|---|---|---|---|
| 9,112,936 | B1 | 8/2015 | Poletto et al. | |
| 2003/0191737 | A1* | 10/2003 | Steele | G06F 16/951 |
| 2007/0154190 | A1* | 7/2007 | Gilley | H04N 21/2547 |
| | | | | 348/E7.069 |
| 2008/0040313 | A1* | 2/2008 | Schachter | G06F 16/9562 |
| 2009/0307221 | A1* | 12/2009 | Ferri | G06F 16/9562 |
| 2010/0070851 | A1* | 3/2010 | Chen | G06F 16/986 |
| | | | | 715/236 |
| 2012/0030554 | A1 | 2/2012 | Toya | |
| 2012/0093482 | A1* | 4/2012 | Wei | H04N 21/8549 |
| | | | | 386/E5.003 |
| 2012/0216102 | A1* | 8/2012 | Malla | G06F 40/169 |
| | | | | 715/206 |
| 2012/0257872 | A1 | 10/2012 | Toyoda et al. | |
| 2014/0129669 | A1* | 5/2014 | Wiseman | H04N 21/84 |
| | | | | 709/217 |
| 2017/0116348 | A1* | 4/2017 | Deleuze | H04L 67/02 |
| 2017/0300591 | A1* | 10/2017 | Quintero | G06F 16/9562 |

FOREIGN PATENT DOCUMENTS

| | | | |
|---|---|---|---|
| JP | 2017-511924 | A | 4/2017 |
| KR | 10-2009-0122763 | A | 12/2009 |
| KR | 10-2011-0114080 | A | 10/2011 |
| KR | 10-1198034 | B1 | 11/2012 |
| KR | 10-1443071 | B1 | 9/2014 |
| KR | 10-1777419 | B1 | 9/2017 |

OTHER PUBLICATIONS

Written Opinion of the International Searching Authority PCT/ISA/237, dated Dec. 12, 2018, in corresponding International Patent Application No. PCT/KR2018/009964.

Office Action dated Dec. 20, 2021 in Korean Patent Application No. 10-2018-0008064.

Office Action dated Jun. 27, 2022, issued in Korean Patent Application No. 10-2018-0008064.

* cited by examiner

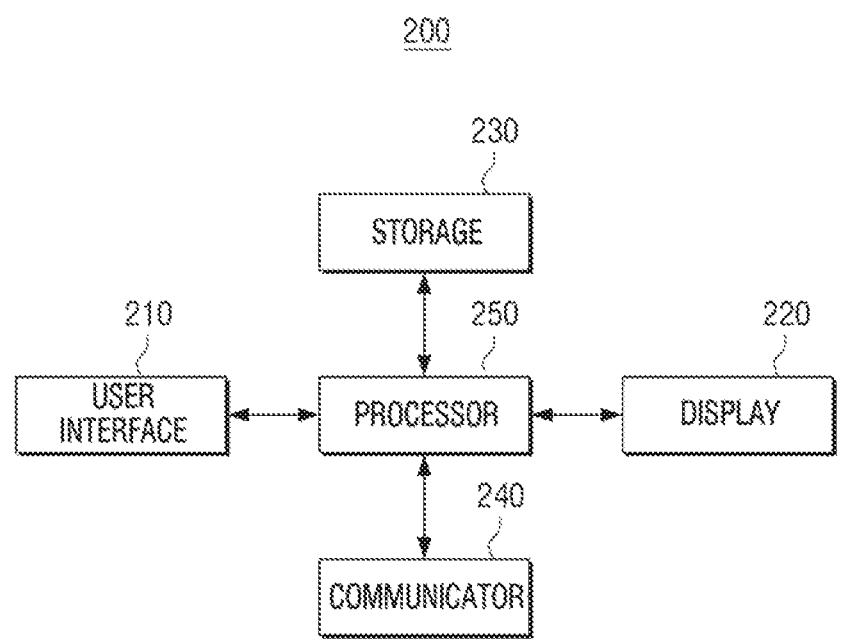

ELECTRONIC DEVICE AND CONTROL METHOD THEREFOR

CROSS-REFERENCE TO RELATED APPLICATIONS

This application is a U.S. National Stage Application which claims the benefit under 35 U.S.C. § 371 of International Patent Application No. PCT/KR2018/009964 filed on Aug. 29, 2018, which claims foreign priority benefit under 35 U.S.C. § 119 of Korean Patent Application 10-2018-0008064 filed on Jan. 23, 2018 in the Korean Intellectual Property Office, the contents of both of which are incorporated herein by reference.

TECHNICAL FIELD

The disclosure relates to an electronic device and a control method therefor, and more particularly to an electronic device for providing a content desired by a user and a control method therefor.

BACKGROUND ART

With the distribution of a mobile electronic device such as a user terminal device, services for providing contents desired by a user anytime are increased. An electronic device in recent years provides a service for setting a bookmark for a content preferred by a user or a content, to which a user wants to return later, and allowing the user to rapidly access the corresponding content.

Such a bookmark function is provided in various applications. In particular, recently, a service for bookmarking contents desired by a user to allow the user to see the contents at once using a bookmark application linked to a web browser or other applications, regardless of platforms providing the contents has been provided.

However, if a bookmarked URL is not able to provide a content, for example, if a web page linked to the bookmarked URL is deleted or blocked or the link of the bookmarked URL is changed and linked to a completely different web page, a user had to search for the corresponding content again or could not find a context of the content provided from the bookmarked URL, thereby causing inconvenience or a difficult situation.

A solution for solving such problems has not been provided in the related art, and thus a method for solving such a problem is provided here.

DISCLOSURE

Technical Problem

The disclosure is made in view of needs for solving the aforementioned problems, and an object of the disclosure is to provide an electronic device for providing a content to a user, even if the content or a web page including the content provided from a URL bookmarked by a user is deleted, and a method for controlling the same.

Technical Solution

According to an aspect of the disclosure, there is provided an electronic device including a communicator including circuitry, a storage storing a uniform resource locator (URL) designated on an external electronic device and information regarding a specific content provided from the designated URL, and a processor configured to, based on an access request for the designated URL being received from the external electronic device via the communicator, identify whether or not the specific content is able to be provided from the designated URL, based on the specific content being unable to be provided, obtain information regarding another URL providing a content related to the specific content using the stored information, and transmit the obtained information regarding the other URL to the external electronic device via the communicator.

The processor may be further configured to, based on a bookmark request for a URL providing the specific content being received, store the URL and metadata related to the specific content in the storage, and obtain information regarding the other URL using the stored metadata.

The processor may be further configured to, based on an access request for the bookmarked URL being received from the external electronic device, access the bookmarked URL, and identify whether or not the specific content is able to be provided from the bookmarked URL based on a response signal according to the access or a source code provided from the accessed URL.

The storage may store a URL bookmarked for each account of a plurality of users and metadata related to a content provided from each URL bookmarked for each account, and the processor may be further configured to, based on the specific content being unable to be provided from the designated URL, compare the metadata related to the specific content with metadata related to a content provided from a URL bookmarked on an account of another user, and obtain information related to a URL providing the content related to the specific content and bookmarked on the account of the other user.

The communicator may communicate with an external server, and the processor may be further configured to, based on the specific content being unable to be provided from the URL, obtain information regarding the other URL searched based on the metadata related to the specific content via the external server.

The metadata may include at least one of a URL, title information, thumbnail, description, a publisher, posted date and time, a category, a service provider, play time, and a screenshot of the specific content.

According to another aspect of the disclosure, there is provided an electronic device including a user interface, a display, a storage storing information regarding a URL designated according to a user input via the user interface, a communicator including circuitry, and a processor configured to, based on an access request for the designated URL being received via the user interface, identify whether or not a specific content is able to be provided from the designated URL, and based on the specific content being unable to be provided, control the communicator to obtain information regarding another URL providing a content related to the specific content from an external electronic device, and control the display to display the obtained information regarding the other URL.

The processor may be further configured to, based on a bookmark request for a URL providing the specific content being received, transmit the URL and metadata related to the specific content to the external electronic device, and based on the specific content being unable to be provided from the bookmarked URL, control the communicator to receive information regarding the other URL obtained by the external electronic device based on the received metadata from the external electronic device.

The processor may be further configured to, based on a bookmark request for a URL providing the specific content being received, store the URL and metadata related to the specific content in the storage, and based on the specific content being unable to be provided from the bookmarked URL, control the communicator to transmit the URL and metadata related to the specific content to the external electronic device and receive information regarding the other URL obtained by the external electronic device based on the received metadata from the external electronic device.

The processor may be further configured to, based on the specific content being unable to be provided from the bookmarked URL, control the display to display a message inquiring whether or not to provide the information regarding the other URL providing a content related to the specific content, and control the communicator to obtain the information regarding the other URL according to a user input requesting for the information related to the other URL.

According to still another aspect of the disclosure, there is provided a method for controlling an electronic device, the method including storing a URL designated on an external electronic device and information regarding a specific content provided form the designated URL, based on an access request for the designated URL being received from the external electronic device, identifying whether or not the specific content is able to be provided from the designated URL, based on the specific content being unable to be provided, obtaining information regarding another URL providing a content related to the specific content using the stored information, and transmitting the obtained information regarding the other URL to the external electronic device.

The storing may include, based on a bookmark request for a URL providing the specific content being received, storing the URL and metadata related to the specific content, and the obtaining may include obtaining information regarding the other URL using the stored metadata.

The identifying may include, based on an access request for the bookmarked URL being received from the external electronic device, accessing the bookmarked URL, and identifying whether or not the specific content is able to be provided from the bookmarked URL based on a response signal according to the access or a source code provided from the accessed URL.

The storing may include, storing a URL bookmarked for each account of a plurality of users and metadata related to a content provided from each URL bookmarked for each account, and the obtaining may include, based on the specific content being unable to be provided from the designated URL, comparing the metadata related to the specific content with metadata related to a content provided from a URL bookmarked on an account of another user, and obtaining information related to a URL providing the content related to the specific content and bookmarked on the account of the other user.

The obtaining may include, based on the specific content being unable to be provided from the URL, obtaining information regarding the other URL searched based on the metadata related to the specific content via the external server.

The metadata may include at least one of a URL, title information, thumbnail, description, a publisher, posted date and time, a category, a service provider, play time, and a screenshot of the specific content.

According to still another aspect of the disclosure, there is provided a method for controlling an electronic device, the method including storing information regarding a URL designated according to a user input, based on an access request for the designated URL being received, identifying whether or not the specific content is able to be provided from the designated URL, based on the specific content being unable to be provided, obtaining information regarding another URL providing a content related to the specific content from an external electronic device, and displaying the obtained information regarding the other URL.

The identifying may include, based on a bookmark request for a URL providing the specific content being received, transmitting the URL and metadata related to the specific content to the external electronic device, and the obtaining may include, based on the specific content being unable to be provided from the bookmarked URL, receiving information regarding the other URL obtained by the external electronic device based on the received metadata from the external electronic device.

The storing may include, based on a bookmark request for a URL providing the specific content being received, storing the URL and metadata related to the specific content, and the obtaining may include, based on the specific content being unable to be provided from the bookmarked URL, transmitting the URL and metadata related to the specific content to the external electronic device and receiving information regarding the other URL obtained by the external electronic device based on the received metadata from the external electronic device.

The obtaining may include, based on the specific content being unable to be provided from the bookmarked URL, displaying a message inquiring whether or not to provide the information regarding the other URL providing a content related to the specific content, and obtaining the information regarding the other URL according to a user input requesting for the information related to the other URL.

Effect of Invention

According to the aspects of the disclosure, even if a content or a web page including a content provided from a URL bookmarked by a user is deleted, it is possible to provide the corresponding content to a user, thereby reducing inconvenience of a user to search for the content again.

DESCRIPTION OF DRAWINGS

FIG. 6 is a block diagram schematically illustrating a configuration of an electronic device according to another embodiment;

DETAILED DESCRIPTION OF EXEMPLARY EMBODIMENTS

Figure 1:
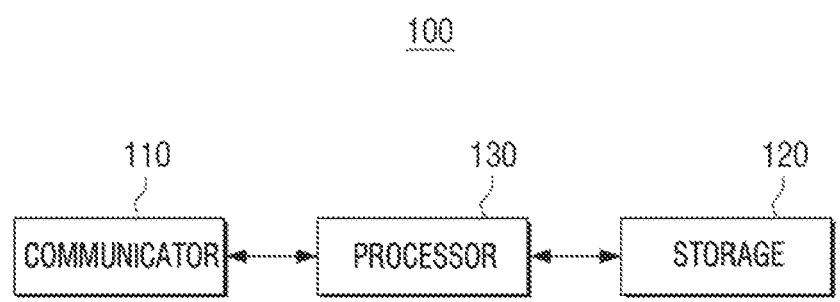
FIG. 1 is a block diagram schematically illustrating a configuration of an electronic device according to an embodiment.

The disclosure will be described in detail after briefly explaining the way of describing the specification and the drawings.

The terms used in the specification and claims have been selected as general terms as possible in consideration of functions in the embodiments of the disclosure. But, these may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, if there are no specific term definitions.

The same reference numerals or symbols in the accompanying drawings in this specification denote parts or components executing substantially the same function. For convenience of description and understanding, the description will be made using the same reference numerals or symbols in different embodiments. That is, although the components with the same reference numerals are illustrated in the plurality of drawings, the plurality of drawings are not illustrating one embodiment.

In addition, terms including ordinals such as "first" or "second" may be used for distinguishing components in the specification and claims. Such ordinals are used for distinguishing the same or similar components and the terms should not be limitedly interpreted due to the use of ordinals. For example, in regard to components with such ordinals, usage order or arrangement order should not be limitedly interpreted with the numbers thereof. The ordinals may be interchanged, if necessary.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module", a "unit", or a "part" in the disclosure is for designating a component executing at least one function or operation, and such a component may be implemented as hardware, software, or a combination of hardware and software. Further, except for when each of a plurality of "modules", "units", "parts" and the like needs to be realized in an individual specific hardware, the components may be integrated in at least one module or chip and be implemented in at least one processor (not shown).

In addition, in the embodiments of the disclosure, connection of a certain part to another part may include indirect connection via still another medium, in addition to direct connection. When it is described that a certain part includes another certain part, it implies that a still another part may be further included, rather than excluding it, unless otherwise noted.

Hereinafter, the disclosure will be described in detail with reference to the accompanying drawings.

FIG. 1 is a block diagram schematically illustrating a configuration of an electronic device according to an embodiment of the disclosure.

An electronic device 100 according to FIG. 1 includes a communicator 110, a storage 120, and a processor 130.

The electronic device 100 may execute a function of a server for providing a service to an external electronic device 200. The electronic device 100 may be implemented as various electronic devices, regardless of types thereof, such as a personal computer (PC), a tablet, a personal digital assistant (PDA), a notebook, a smartphone, and the like, and the technical idea of the disclosure is not limited to the type of the electronic device 100. The external electronic device 200 receiving a service from the electronic device 100 may also be implemented as various types of electronic devices described above.

Hereinafter, the description will be made by assuming the electronic device 100 as a server and the external electronic device 200 as a user terminal device, for convenience. However, interpretation scope of the electronic device 100 and the external electronic device 200 should not be limited due to the terms of the server and the user terminal device.

The communicator 110 may execute communication with the user terminal device 200 by various wired or wireless communication methods.

If the communicator 110 communicates with the user terminal device 200 in a wired manner, the communicator 110 may include a connector which is physically realized to execute the communication with the user terminal device 200 and may execute communication via a medium such as a copper wire or an optical fiber in local area network (LAN) and wide area network (WAN).

If the communicator 110 communicates with the user terminal device 200 in a wireless manner, the communicator 110 may include various communication chips according to various communication methods such as Wi-Fi, Long Term Evolution (LTE), Bluetooth, Bluetooth low energy, Zigbee, and the like, as interfaces to be connected to the user terminal device 200 in a wireless manner.

In addition, the communicator 110 may also execute connection with the Internet network, in addition to the user terminal device 200, and specific embodiment will be described with reference to FIG. 4.

The storage 120 is a component for storing a uniform resource locator (URL) designated on the user terminal device 200 and information regarding a specific content provided from the designated URL.

Specifically, when a user designates a URL of a content or a URL of a website providing a content, the user terminal device 200 may store information regarding the designated URL in a list form and provide a platform for allowing a user to access the information regarding the designated URL anytime. Such a platform may be provided through an application for managing the URL designated by a user and such an application may be provided from the server 100.

When the user of the user terminal device 200 generates a user account and registers the generated user account on the server 100, the user may access the user account by executing the application provided from the server 100 and access the information regarding the URL designated by the user through the platform provided through the application.

In a state where a specific content is displayed on a screen, the user may designate a URL of the specific content via various inputs such as commands of share, clipping, link copy, bookmark, and URL open of the specific content. In addition, the user may designate a URL of a web page providing a specific content by bookmarking the web page providing the specific content. A menu for designating the URL providing the specific content will be described in detail with reference to FIG. 2C.

Hereinafter, operations of a user of designating a URL of a specific content or designating a URL of a web page providing a specific content to access the designated URL and store information regarding the designated URL will be referred to as an expression that a user "bookmarks" the URL providing the specific content. The term "bookmark" representatively used herein is not limitedly interpreted by the dictionary definition and may be interpreted to include various operations for storing the URL providing the specific content such as shearing, clipping, and the like descried above.

The specific content herein may refer to a content bookmarked by a user or texts, images, and videos posted on a content providing area (content display area) of a web page bookmarked by a user.

When a URL is bookmarked by a user on the user terminal device 200, the storage 120 may additionally store information regarding a specific content provided from the bookmarked URL. The information regarding the specific content herein is metadata related to the specific content and the metadata may include at least one of an original URL, title information, thumbnail, description, a publisher, posted date and time, a category, a service provider, play time, and a screenshot of the specific content. In addition, the metadata may be added in accordance with the attribute of the content.

Such meat data may be obtained based on information displayed on a web page provided from the bookmarked URL, a source code provided from the bookmarked URL, a source code provided form an original URL of a specific content provided from the bookmarked URL, or the like.

The storage 120 may match the bookmarked URL with the metadata described above of the specific content provided from the bookmarked URL and store these.

The storage 120 may include a hard disk drive (HDD), a solid state drive (SSD), a DRAM memory, a SAM memory, a FRAM memory, or a flash memory and may include a memory in various storage formats not mentioned herein. In other words, the type of the storage 120 does not affect the technical idea of the disclosure.

The processor 130 is a component for controlling general operations of the server 100. Particularly, the processor 130 may identify whether or not the specific content is able to be provided from the bookmarked URL, when an access request for the bookmarked URL is received from the user terminal device 200 via the communicator 110.

Specifically, the user of the user terminal device 200 may log in a user account and select one URL (hereinafter, first URL) from a bookmark list displayed on an application provided from the server 100. When the access request is received, the processor 130 may access the first URL and identify whether or not a specific content (hereinafter, first content) is able to be provided from the first URL based on a response signal according to the access or a source code provided from the first URL.

Examples of a case where the first content is unable to be provided from the first URL may include a case where a web page linked to the first URL is deleted or blocked, and a case where the link of the first URL is changed and linked to a completely different web page. In such a case, the first content according to the user's intention may not be provided, even if the user accesses the first URL. At this time, the processor 130 may access the first URL and determine that the first content is unable to be provided, if a response signal is not received from the accessed first URL or the information regarding the first content is not included in the response signal.

If the first content is a video clip, the response signal may include frame information of the video, if the first content is able to be provided from the first URL. However, if the first content is unable to be provided from the first URL, the response signal may not include the frame information of the video, and in this case, the processor 130 may determine that the first content is unable to be provided from the first URL.

Alternatively, the processor 130 may access the first URL, extract a source code provided from the first URL, and determine that the first content is unable to be provided, if the source code does not include the information regarding the first content.

In general, when the web page linked to the first URL is deleted or blocked and when the link of the first URL is changed and linked to a completely different web page which are described above as examples, the first URL may be collectively referred to as "broken URL" in the related technical field. An algorithm for identifying whether or not the first URL is a broken URL has been widely known in the related art, and there are also a large number of programs using such an algorithm (broken URL checker and the like), and therefore, specific description regarding the identification algorithm will be omitted.

In addition, examples of the case where the first content is unable to be provided from the first URL may include a case where only the first content is deleted from the web page linked to the first URL or the playback of the first content is blocked due to a request of a publisher of the first content. Hereinafter, the first content may be referred to as a "broken content" in the same expression form as the broken URL, for convenience.

In this case, the first content according to the user's intention may not be provided either, even if the processor accesses the first URL. At this time, the processor 130 may access the first URL and determine that the first content is unable to be provided, if the response signal received from the accessed first URL does not include the information regarding the first content.

Alternatively, the processor 130 may access the first URL, extract a source code provided form the accessed first URL, and determine that the first content is unable to be provided, if the source code does not include the information regarding the first content or includes information indicating that the first content is unable to be played.

In addition, the processor 130 may secondarily access an original URL (URL provided from an original website of the first content) of the first content provided from the accessed first URL, and identify whether or not the content is able to be provided based on at least one of a response signal from the original URL, information displayed from the original URL, and a source code provided from the original URL.

If the first content is determined unable to be provided from the first URL, the processor 130 may obtain information regarding another URL (hereinafter, second URL) providing the first content using information stored in the storage 120 and provide the information to the user terminal device 200.

Specifically, the processor 130 may obtain information regarding the second URL providing a content same as or similar to the first content using an original URL, title information, a thumbnail image, description, a publisher, posted date and time, a category, a service provider, play time, a screenshot, and the like of the first content which are metadata stored in the storage 120.

The information regarding the second URL may be obtained through internal information stored in the storage 120 or external information stored in an external server (not shown) connected to the server 100.

The processor 130 may preferentially obtain the information regarding the second URL through the internal information stored in the storage 120. The storage 120 may store a bookmarked URL for each user account of each of a plurality of users and metadata related to a content provided from each bookmarked URL for each user account, and the processor 130 may obtain the information regarding the second URL using bookmark information of other users and provide the obtained information related to the second URL to the user.

Specifically, if the first content is unable to be provided from the first URL, the processor 130 may compare the metadata related to the first content with metadata related to a content provided from a bookmarked URL in an account of another user and obtain information related to the second URL bookmarked in the account of the other user and providing a content same as or similar to the first content.

For example, the information regarding the second URL providing the content same as or similar to the first content may be obtained by comparing keywords included in the title information of the metadata, in a case of using the title information among the pieces of metadata, or by calculating a similarity between thumbnail images of the metadata through image analysis, in a case of using the thumbnail image.

If there is no second URL providing the same content as the first content, information regarding the second URL providing the similar content to the first content may be obtained, and the second URL which is able to provide a content having a highest similarity may be obtained based on the metadata. In addition, the processor 130 may additionally provide a URL which is able to provide a content having similar characteristics to the user based on the characteristics (genre, characters, containing keywords, and the like) of the first content, in addition to the content same as or similar to the first content.

If the information related to the second URL providing the content same as or similar to the first content is not obtained through the internal information stored in the storage 120, the processor 130 may obtain information related to the second URL providing the content same as or similar to the first content through an external server. In this case, the processor 130 may transmit the metadata related to the first content to the external server and the external server may search for the corresponding metadata with a search keyword, thereby transmitting the information related to the second URL providing the content same as or similar to the first content to the server 100.

The external server may be a server providing a search service using a search engine or a plurality of content providing servers providing contents. For example, if the content is a video clip, the content providing server may be content providing servers in which content providers (CP) are Youtube, Vimeo, Facebook, Instagram, Naver, and the like, and if the content is an article, the content providing server may be content providing servers in which content providers (CP) are Facebook, Instagram, Twitter, Naver News, Tumblr, and the like. If the number of the content providing servers is more than one as described above, the processor 130 may transmit the metadata related to the first content to each content providing server in the set order of priority so that the content providing server may perform the searching sequentially according to the order of priority.

The server 100 may process the information related to the second URL received from the external server and transmit the information to the user terminal device 200, and the user terminal device 200 may provide a content same as or similar to the first content to a user based on the received information.

According to an embodiment of the disclosure, when a bookmark request for the first URL providing the first content is received by a user, the processor 130 may generate a screenshot image of at least a part of a screen of the bookmarked first URL and store the generated screenshot image as metadata related to the bookmarked first URL. If the first content is unable to be provided from the bookmarked first URL, the processor 130 may perform image search using at least a part of an area including the content from the screenshot image. If the first content is a video clip, the processor 130 may predict an area where the video clip is positioned in the screenshot image through image analysis and extract at least a part of the area where the video clip is positioned. The processor 130 may transmit the extracted image to an external server, perform an image search through a search engine of an external server, and obtain information related to the second URL providing the content same as or similar to the first content.

Figure 2A:
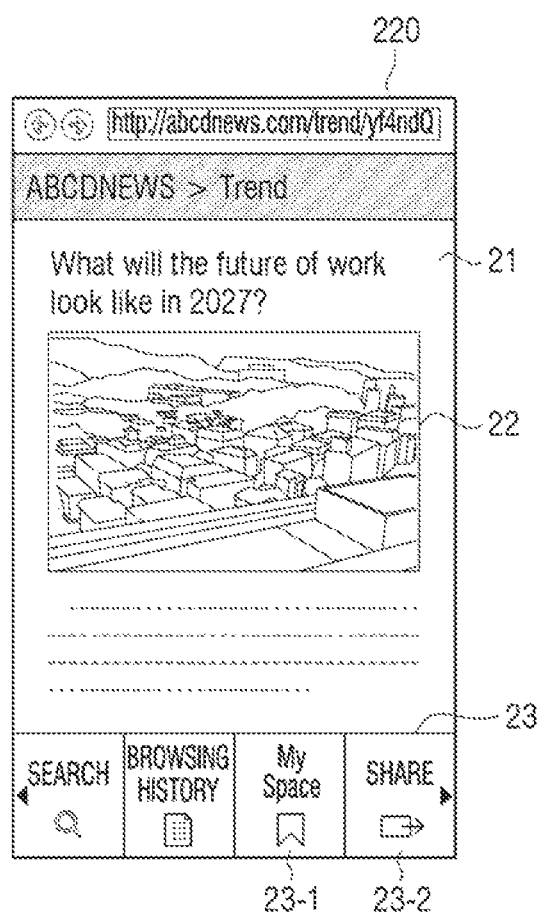
FIGS. 2A to 2C are views for explaining a method for bookmarking a URL providing a specific content according to an embodiment.
Figure 2B:
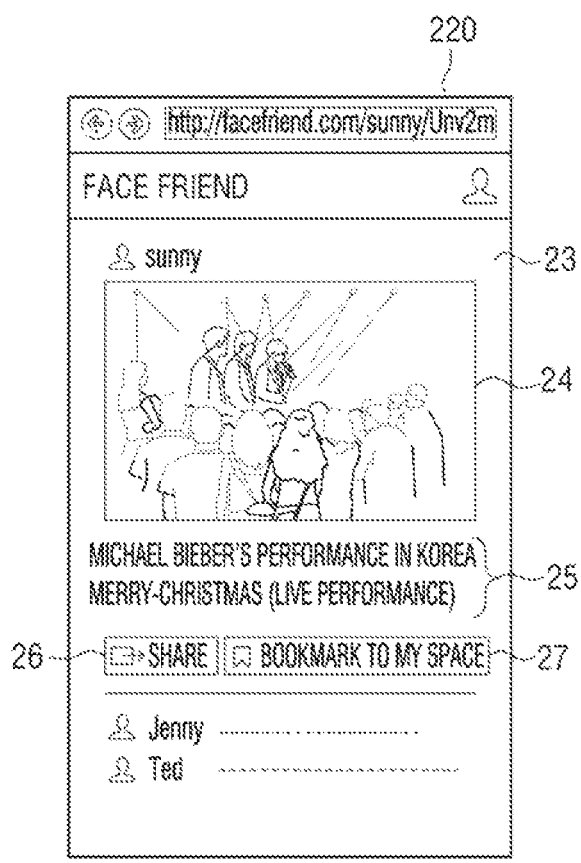
Figure 2C:
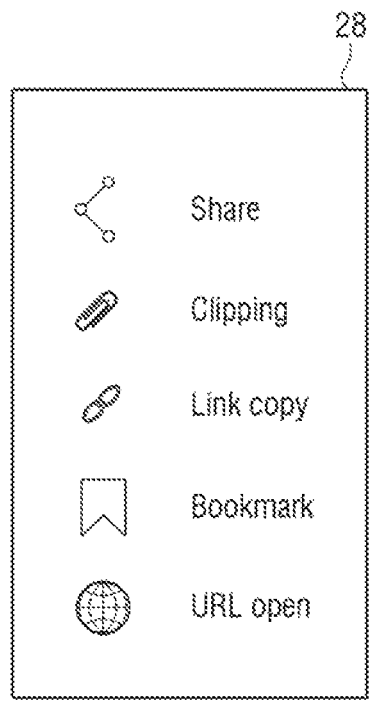

FIGS. 2A to 2C are views for explaining a method for bookmarking a URL providing a specific content according to an embodiment of the disclosure.

FIG. 2A illustrates a display screen 220 of the user terminal device 200 assuming that the user accesses "http://abcdnews.com" and reads a news article 21 with a title of "What will the future of work look like in 2027?" on the user terminal 200. The user may want to bookmark the article to return to it later. At this time, the user may select a "My space" item 23-1 from a menu 23 displayed in an area of the screen. The menu 23 may be displayed as a pop-up menu, a sliding menu, or a menu always fixed on a corresponding area according to the user input.

When the user selects the "My space" item 23-1, a URL (http://abcdnews.com/trend/yf4ndQ) of the article 21 may be bookmarked and stored in the storage 120. The processor 130 may store metadata related to the article 21 together with the URL of the article 21. The stored metadata herein may be the title ("What will the future of work look like in 2027?") of the article 21, a URL (http://abcdnews.com/gRdCiT/35fg.jpg) of an image 22 inserted to the article 21, a content of the article 21, information regarding a writer of the article 21, and the like.

Meanwhile, when the user selects the "My Space" item 23-1, an application "My Space" provided from the server 100 may be associated and executed, the URL of the article 21 and the metadata related thereto may be stored and a bookmark list stored in the server 100 may be updated on the application.

If the user wants to share the article 21 with another user and selects a "share" item 23-2, the URL of the article 21 and the metadata related thereto may be stored and a shared list stored in the server 100 may be updated in the same manner as described above.

FIG. 2B illustrates the display screen 220 of the user terminal device 200 assuming that the user accesses "http://facefriend.com" and watches a video clip 24 "Michael Bieber's performance in Korea" uploaded by a publisher "sunny" on the user terminal device 200. The user may want to bookmark a post 23 to watch the video clip 24 later. At this time, the user may select a "bookmark to my space" item 27 displayed on one area of the screen.

When the user selects the "bookmark to my space" item 27, a URL (http://facefriend.com/sunny/Unv2m) of the post 23 is bookmarked and stored in the storage 120. At this time, the processor 130 may store metadata related to the video clip 24 included in the post 23 together with the URL of the post 23. The metadata stored herein may be an original URL (http://youtuby.com/Y5SatbZMAo) of the video clip 24, a title and description 25 of the post 23 regarding the video clip 24 ("Michael Bieber's performance in Korea", "merry-christmas (live performance)"), a thumbnail URL (Lttp://youtuby.com/Swt2df35IUf42.jpg) of the video clip 24, a publisher (sunny) of the video clip 24, posted date and time of the video clip 24, play time of the video clip 24, category information of the video clip 24, a content provider of the video clip 24, and the like.

When the user selects the "bookmark to my space" item 27, the application "My space" provided from the server 100 may be associated and executed, the URL of the post 23 and metadata related to the video clip 24 may be stored and a bookmark list stored in the server 100 may be updated on the application.

If the user wants to share the post 23 with another user and selects a "share" item 26, the URL of the post 23 and the metadata related to the video clip 24 may be stored and a shared list stored in the server 100 may be updated in the same manner as described above.

FIG. 2C illustrates a menu for designating a content according to an embodiment of the disclosure. Referring to FIG. 2C, a menu 28 according to a user input may be displayed in a pop-up or sliding manner in a state where a screen accessed (or connected) to the URL providing a content is displayed.

The menu 28 may include a "share" item for sharing a specific content with another user, a "clipping" item for storing a URL providing a specific content and storing some information related to the content provided from the URL, a "link copy" item for copying an original URL of the content provided from the URL, a "bookmark" item for storing the URL providing the specific content, and a "URL open" item for separately accessing the original URL of the content provided from the URL.

The user may designate a URL providing a content by a method for selecting one of the plurality of items described above.

Figure 3:
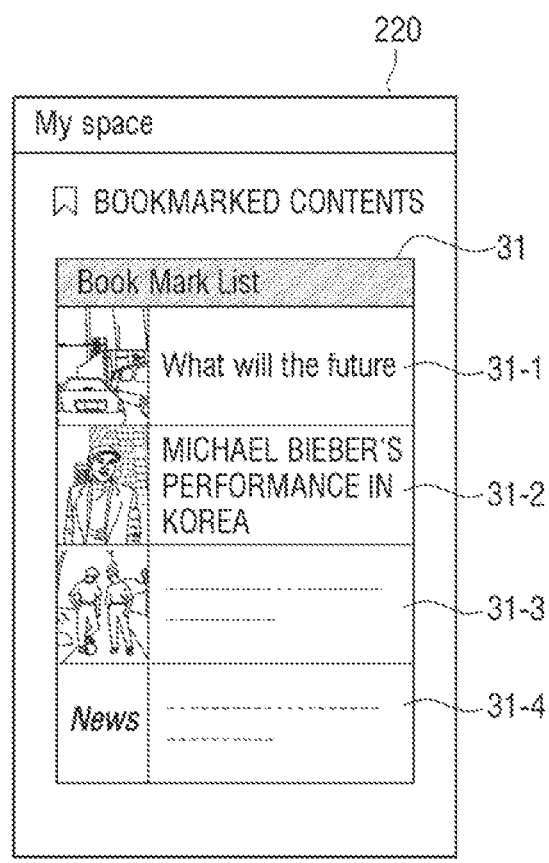
FIG. 3 is a view illustrating a bookmark list according to an embodiment.

FIG. 3 is a view illustrating a bookmark list according to an embodiment of the disclosure.

Referring to FIG. 3, the user terminal device 200 may display a screen showing execution of an application provided from the server 100 on the display 220. A list 31 of the contents bookmarked by the user may be displayed on the screen. The list 31 may include an item 31-1 linked to the URL of the news article clipped by the user, an item 31-2 linked to the URL 31-2 of the post of the video clip bookmarked by the user, and the like.

Each of the items 31-1 to 31-4 may include a thumbnail image and texts (title, description, and the like of the content) based on the metadata related to the content provided from the linked URL.

Figure 4:
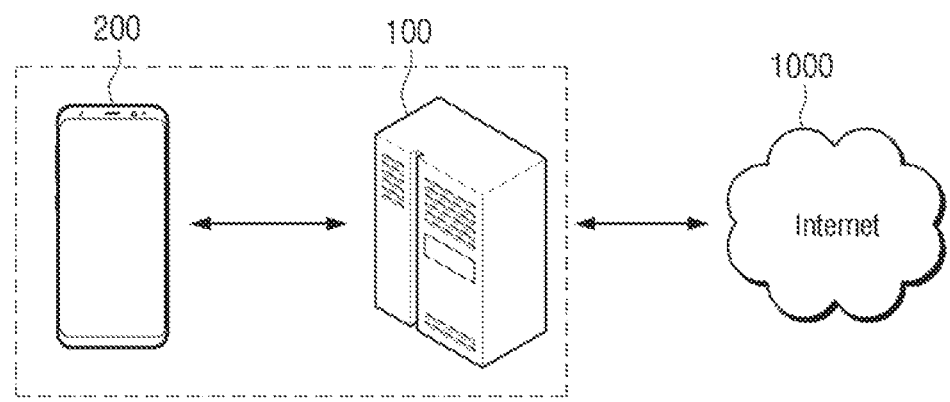
FIG. 4 is a view for explaining a content providing method according to communication between a server and a user terminal device according to an embodiment.

FIG. 4 is a view for explaining a content providing method according to communication between a server and a user terminal device according to an embodiment of the disclosure.

As described above, the server 100 may provide the information regarding the second URL to the user through any one of a first method for obtaining information regarding the second URL providing a content same as or similar to the first content provided from the broken first URL or a content same as or similar to the broken first content based on a bookmarked URL of another user and metadata stored in the internal storage 120, and a second method for obtaining information regarding the second URL providing a content same as or similar to the first content provided from the broken first URL or a content same as or similar to the broken first content through an external server providing a search service using a search engine.

The content provided from the second URL which is same as or similar to the first content is preferably a content which is not broken so as to be providable to the user. The processor 130 may obtain another URL having the highest coincidence of the metadata related to the first content and identify whether or not the content same as or similar to the first content is able to be provided from the obtained other URL. Such an identification operation is repeatedly performed until a URL capable of providing the content same as or similar to the first content is obtained, and information regarding a URL capable of providing the content same as or similar to the first content may be finally provided to the user as the information regarding the second URL.

In a case of obtaining the information regarding the second URL by the first method, it is advantageous in that the information regarding the second URL may be accurately and rapidly obtained, because the URL and the metadata of the other user stored in the same format are referred to.

In addition, in a case of obtaining the information regarding the second URL by the second method, it is advantageous in that a possibility of obtaining the information regarding the second URL is higher than that obtained by the first method, because the information regarding the second URL is widely searched through the Internet 1000.

In a case of obtaining the information regarding the second URL by the first method, the processor 130 may obtain the information regarding the second URL using only a predetermined type of metadata having a high priority according to the preset order of priority. For example, if the first content is a video clip, from the pieces of the metadata related to the first content, the title of the video clip may be set as first priority, the thumbnail image of the video clip may be set as second priority, description may be set as third priority, the publisher may be set as fourth priority, the category of the first content may be set as fifth priority, the provider (CP) of the first content may be set as sixth priority, and the play time of the first content may be set as seventh priority. In such a case, the processor 130 may obtain the information regarding the second URL using only the type of metadata preset in the order of high priority as keyword.

Such an order of priority may be changed depending on the type of the first content or user pattern.

Figure 5A:
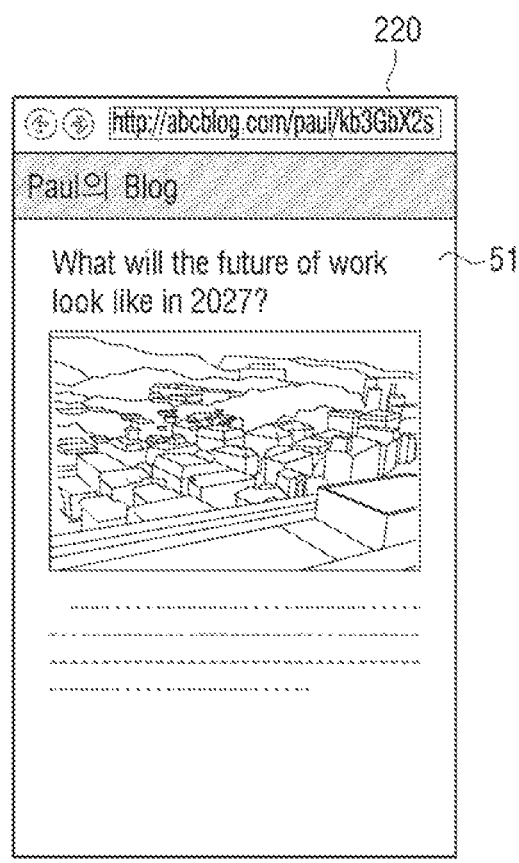
FIGS. 5A and 5B are views illustrating an access screen of other URLs providing specific contents according to an embodiment.
Figure 5B:
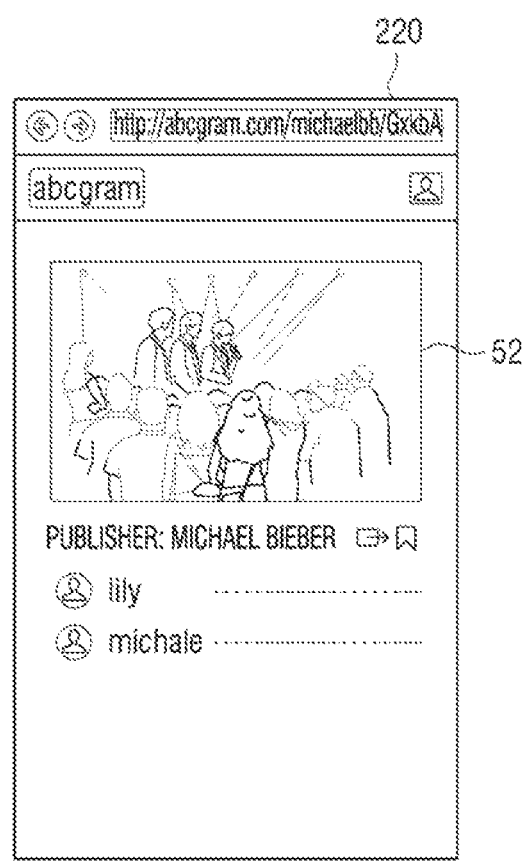

FIGS. 5A and 5B are views illustrating an access screen of other URLs providing specific contents according to an embodiment of the disclosure.

As illustrated in FIG. 5A, if the bookmarked URL (http://abcdnewscom/trend/yf4ndQ) providing the news article 21 is broken or the news article 21 is deleted, another URL (http://abcblogcom/paul/kb3GbX2s) providing a news article 51 which is same as the news article 21 may be accessed.

In addition, as illustrated in FIG. 5B, if the bookmarked URL (http://facefriend.com/sunny/Unv2m) providing the video clip 24 is broken or the post of the video clip 24 is deleted, another URL (http://abcgram.com/michaelbb/GxkbA) providing a video clip 52 which is same as the video clip 24 may be accessed.

Therefore, the user may have reliability regarding the bookmark of the content, because the bookmarked content may be provided even from another URL, regardless of the breaking of the URL or the content.

FIG. 6 is a block diagram schematically illustrating a configuration of an electronic device according to another embodiment of the disclosure.

The electronic device 200 referring to FIG. 6 may include a user interface 210, a display 220, a storage 230, a communicator 240, and a processor 250.

The user interface 210 is a component which receives a user input. The user interface 210 may be implemented as a physical button or may also be implemented as a touch panel. According to an embodiment, if the display 220 is implemented as a touch display, the user interface 210 is not separately included, and the function of the user interface 210 may be incorporated in the display 220.

The display 220 is a component which displays the obtained information regarding the other URL under the control of the processor 250.

The implementation form of the display 220 is not limited, and, for example, may be implemented as various types of displays such as a liquid crystal display (LCD), an organic light emitting diode (OLED) display, an active-matrix organic light-emitting diode (AM-OLED), a plasma display panel (PDP), and the like. The display 220 may additionally include additive components in accordance with the implementation form thereof. For example, if the display 220 is a liquid crystal form, the display 220 may include an LCD display panel (not shown), a backlight unit supplying light thereto (not shown), and a panel driving substrate (not shown) for driving the panel (not shown).

The storage 230 is a component for storing information regarding a URL designated in accordance with a user input via the user interface 210. The information regarding the URL may be a bookmarked URL and may also include metadata related to a specific content provided from the bookmarked URL. The specific configurations and operations of the storage 230 are the same as those of the storage 120 of the electronic device 100 described above, and therefore the description thereof will not be repeated.

The communicator 240 is a component which performs communication with the external electronic device 100. The configurations and operations of the communicator 240 are also the same as those of the communicator 110 of the electronic device 100 described above, and therefore the description thereof will not be repeated.

When an access request for the designated URL is received from the external electronic device 100 via the user interface 210, the processor 250 may identify whether or not the specific content is able to be provided from the designated URL. If the specific content is unable to be provided, the processor 250 controls the communicator 240 to obtain information regarding another URL providing a content related to the specific content from the external electronic device 100 and control the display 220 to display the obtained information regarding the other URL.

When a bookmark request for the URL providing the specific content is received, the processor 250 according to a first embodiment may control the communicator 240 to transmit the URL and metadata related to the specific content to the external electronic device 100, and if the specific content is unable to be provided from the bookmarked URL, to receive the information regarding the other URL obtained based on the metadata from the external electronic device 100.

In addition, when the bookmark request for the URL providing the specific content is received, the processor 250 according to a second embodiment may store the URL and metadata related to the specific content in the storage 230, and if the specific content is unable to be provided from the bookmarked URL, control the communicator 240 to transmit the URL and the metadata related to the specific content to the external electronic device 100 and receive the information regarding the other URL obtained based on the metadata from the external electronic device 100.

That is, according to an embodiment, the electronic device 200 may transmit the URL providing the specific content and the metadata related to the specific content to the external electronic device 100 or store these in the electronic device 200.

If the specific content is unable to be provided from the bookmarked URL, the processor 250 may control the display 220 to display a message inquiring whether or not to provide the information related to the other URL providing the content related to the specific content. At this time, if a user input for requesting for the information regarding the other URL is received, the processor 250 may control the communicator 240 to obtain the information regarding the other URL.

Figure 7:
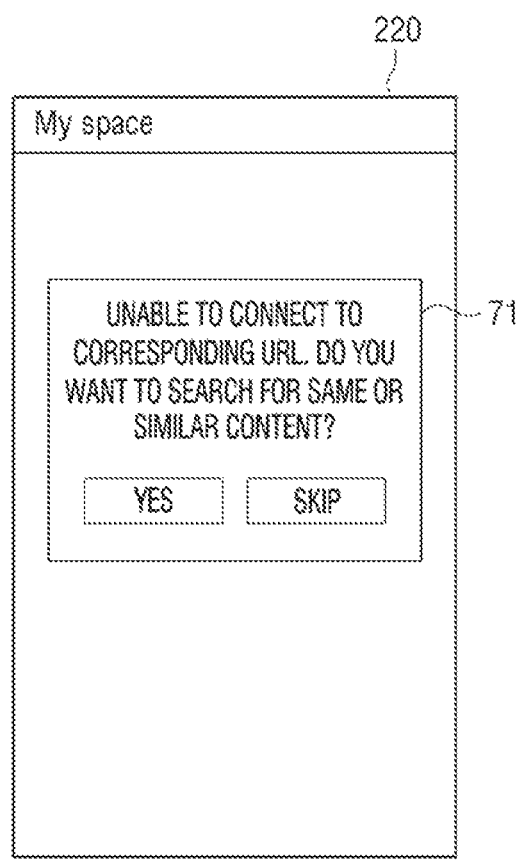
FIG. 7 is a view illustrating a message inquiring for connection to another URL according to an embodiment.

FIG. 7 is a view illustrating a message inquiring for connection to another URL according to an embodiment of the disclosure.

As illustrate in FIG. 7, if the specific content is unable to be provided from the URL selected from the bookmark list, the processor 250 may control the display 220 to display a message 71 inquiring whether or not to provide information related to the other URL providing the content related to the specific content which is unable to be provided.

If a user performs an input for requesting for the information related to the other URL (selects "YES"), the processor 250 may control the communicator 240 to obtain the information regarding the other URL. If a user performs an input for not requesting for the information related to the other URL (selects "SKIP"), the processor 250 may not perform the operation for obtaining the information regarding the other URL and display a message notifying that the content is not found.

Figure 8:
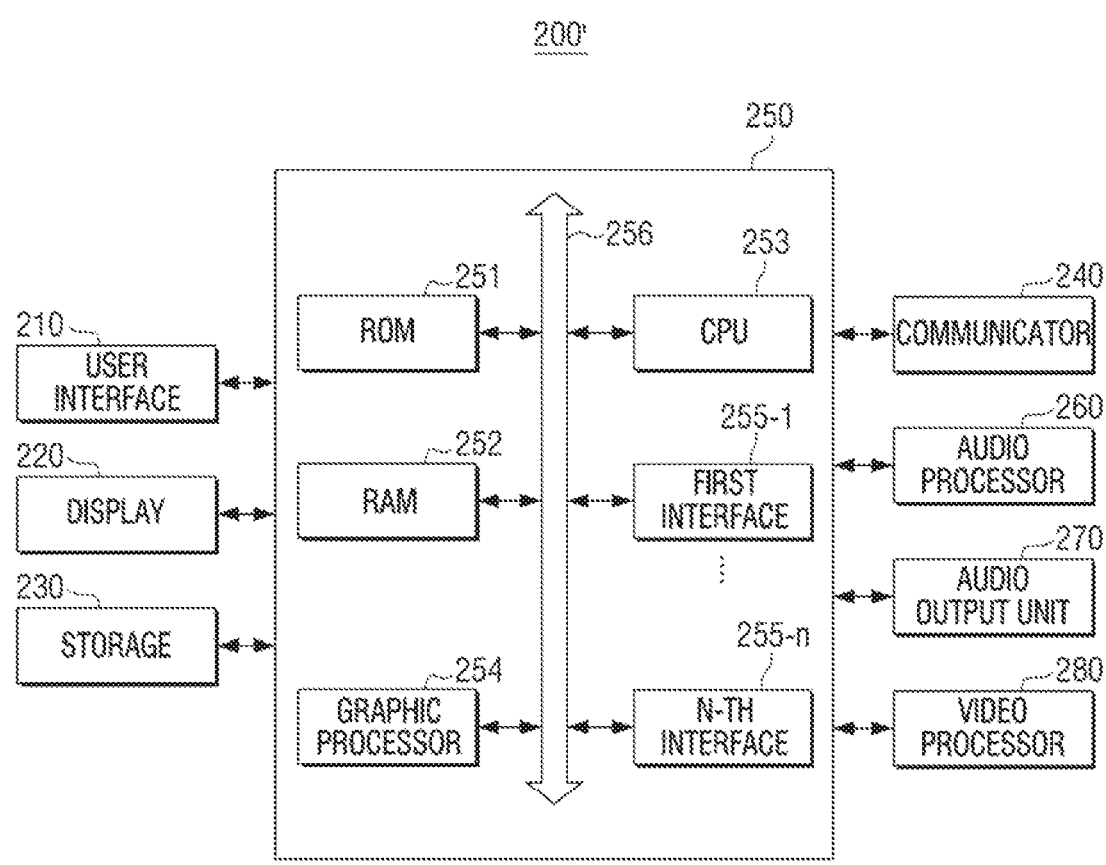
FIG. 8 is a block diagram specifically illustrating a configuration of an electronic device according to the other embodiment.

FIG. 8 is a block diagram specifically illustrating a configuration of an electronic device according to the other embodiment of the disclosure.

As illustrated in FIG. 8, an electronic device 200' according to another embodiment of the disclosure may include the user interface 210, the display 220, the storage 230, the communicator 240, the processor 250, an audio processor 260, an audio output unit 270, and a video processor 280. Hereinafter, the description overlapped with the description regarding some components in FIG. 6 will not be repeated.

The storage 230 may store a plurality of OS software modules for operating the electronic device 200' and various pieces of data such as various multimedia contents.

In addition, the storage 230 may store a base module which processes a signal transmitted from each hardware included in the electronic device 200', a storage module which manages a database (DB) or a registry, a graphic processing module for generating a screen with a layout, a security module, and the like.

The processor 250 may include a ROM 251, a RAM 252, a CPU 253, a graphic processor 254, and first interface 255-1 to n-th interface 255-*n*. The ROM 251, the RAM 252, the CPU 253, the graphic processor 254, and the first interface 255-1 to the n-th interface 255-n may be connected to each other via a bus 256.

The CPU 253 may execute the booting using O/S stored in the storage 230 by accessing the storage 230. The CPU 253 may execute various operations using various programs, contents, data, and the like stored in the storage 230.

The ROM 251 may store a set of instructions for system booting. If a turn-on instruction is input to supply power, the CPU 253 copies the O/S stored in the storage 230 to the RAM 252 and boots the system up by executing the O/S according to the instruction stored in the ROM 251. If the booting is completed, the CPU 253 copies various application programs stored in the storage 230 to the RAM 252 and executes various operations by executing the application programs copied to the RAM 252.

The graphic processor 254 generates a screen including various objects such as icons, images, texts, and the like by using an operating unit (not shown) and a rendering unit (not shown). The operating unit may calculate attribute values such as a coordinate value of each object to be displayed, a shape, a size, a color and the like thereof according to the layout of the screen. The rendering unit may generate screens having various layouts including objects based on the attribute values calculated by the operating unit.

The first interface 255-1 to the n-th interface 255-n may be connected to various components described above. One of the interfaces may be a network interface connected to an external device via a network.

The operation of the processor 250 described above may be realized with the execution of programs stored in the storage 230.

The audio processor 260 is a component executing processing of audio data.

The audio output unit 270 may be a component outputting the audio data processed by the audio processor 260.

The video processor 280 may be a component executing various image processing such as decoding, scaling, noise filtering, frame rate conversion, or resolution conversion regarding the content.

Figure 9:
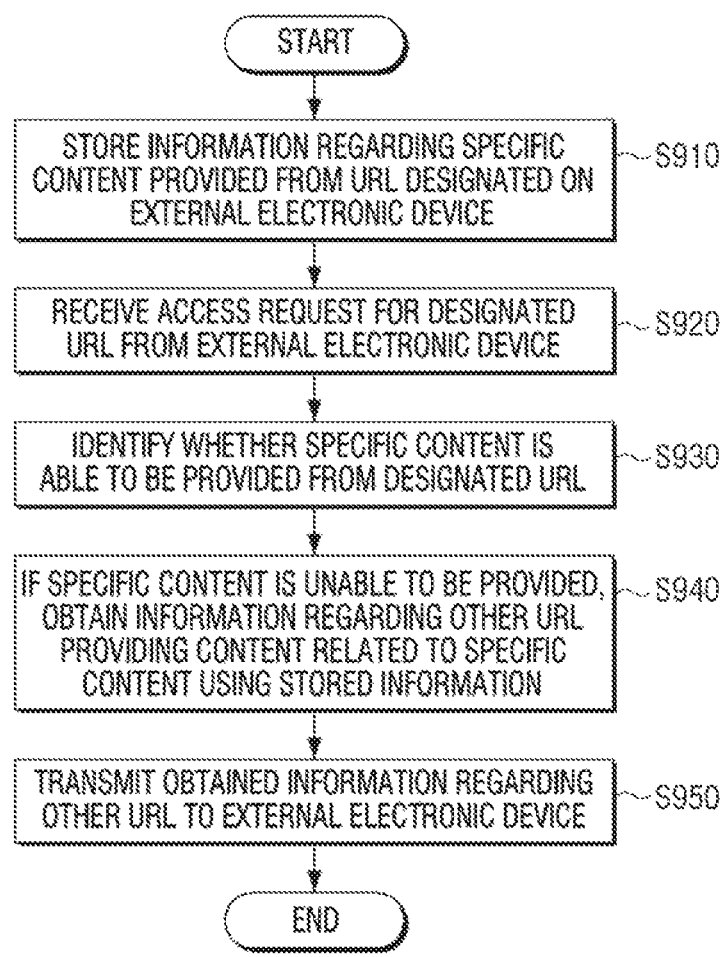
FIG. 9 is a flowchart for explaining a method for controlling an electronic device according to an embodiment.

FIG. 9 is a flowchart for explaining a method for controlling an electronic device according to an embodiment of the disclosure.

Information regarding a specific content provided form a URL designated on an external electronic device is stored (S910). If a bookmark request for the URL providing the specific content is received, the URL and metadata related to the specific content may be stored. In particular, the URL bookmarked for each account of a plurality of users and metadata related to the content provided from each URL bookmarked for each account may be stored. The metadata may include at least one of a URL, title information, a thumbnail, description, a publisher, posted date and time, a category, a service provider, play time, and a screenshot of the specific content.

Then, an access request for the designated URL is received from the external electronic device (S920).

It is identified whether or not the specific content is able to be provided from the designated URL (S930). When the access request for the bookmarked URL is received from the external electronic device, the bookmarked URL is accessed, and it may be identified whether or not the specific content is able to be provided from the bookmarked URL based on a response signal according to the access or a source code provided from the accessed URL.

If the specific content is unable to be provided, information regarding another URL providing a content related to the specific content is obtained using the stored information (S940). The information regarding the other URL may be obtained using the stored metadata. Specifically, information regarding a URL providing a content related to the specific content and bookmarked on an account of another user may be obtained by comparing the metadata related to the specific content with metadata related to the content provided from the URL bookmarked on the account of the other user.

In addition, information regarding another URL searched based on the metadata related to the specific content may be obtained via an external server providing a search service using a search engine.

Then, the obtained information regarding the other URL is transmitted to the external electronic device (S950).

Figure 10:
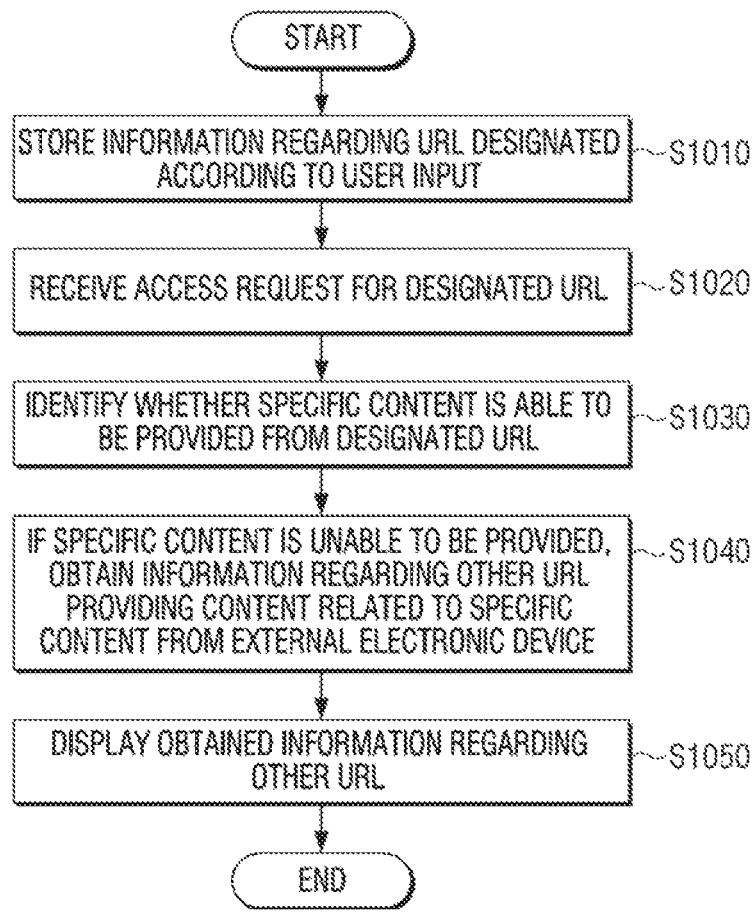
FIG. 10 is a flowchart for explaining a method for controlling an electronic device according to another embodiment.

FIG. 10 is a flowchart for explaining a method for controlling an electronic device according to another embodiment of the disclosure.

Information regarding a URL designated according to a user input is stored (S1010).

Then, an access request for the designated URL is received (S1020).

After that, it is identified whether or not the specific content is able to be provided from the designated URL (S1030). If a bookmark request for the URL providing a specific content is received, the URL and metadata related to the specific content may be transmitted to an external electronic device.

According to another embodiment, the URL and the metadata related to the specific content may be stored in the electronic device 100.

Then, if the specific content is unable to be provided, information regarding another URL providing a content related to the specific content is obtained from an external electronic device (S1040). If the specific content is unable to be provided from the bookmarked URL, the information regarding the other URL obtained based on the metadata may be received from the external electronic device which has received the URL and the metadata related to the specific content. In addition, before obtaining the information regarding the other URL, a message inquiring whether or not to provide the information related to the other URL providing the content related to the specific content may be displayed, and the information regarding the other URL may be obtained according to a user input requesting for the information related to the other URL.

Further, if the URL and the metadata related to the specific content are stored in the electronic device 100, the URL and the metadata related to the specific content may be transmitted to the external electronic device, and the information regarding the other URL obtained based on the metadata may be received from the external electronic device which has received the URL and the metadata related to the specific content.

Then, the obtained information regarding the other URL is displayed (S1050).

The control method according to the embodiments described above may be implemented as programs and stored in various recording media. That is, computer programs processed by various processors to execute various control methods described above may be stored and used in recording media.

For example, a non-transitory computer readable medium storing a program executing, storing a URL designated on an external electronic device and information regarding a specific content provided from the designated URL, based on an access request for the designated URL being received from the external device, identifying whether or not the specific content is able to be provided from the designated URL, based on the specific content being unable to be provided, obtaining information regarding another URL providing a content related to the specific content using the stored information, and transmitting the obtained information regarding the other URL to the external electronic device may be provided.

The non-transitory computer readable medium is not a medium storing data for a short period of time such as a register, a cache, or a memory, but means a medium that semi-permanently stores data and is readable by a machine. Specifically, various applications or programs described above may be stored and provided in the non-transitory computer readable medium such as a CD, a DVD, a hard disk, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
    a communicator comprising circuitry;
    a storage storing a plurality of uniform resource locators (URLs) designated on an external electronic device and information regarding at least one of specific contents provided from each of the designated URLs; and
    a processor configured to:
    based on an access request for a first URL providing a first content among the designated URLs being received from an external electronic device via the communicator, access the first URL and identify whether or not the first content corresponding to the first URL is able to be provided from the first URL based on a response signal according to the access or a source code provided from the accessed first URL,
    based on the first content corresponding to the first URL being unable to be provided, obtain information regarding second URL providing a content related to the first content corresponding to the first URL using the stored information, and
    transmit the obtained information regarding the second URL to the external electronic device via the communicator such that the external electronic device obtains the first content based on the second URL,
    wherein the storage stores a URL bookmarked for each account of a plurality of users and metadata related to a specific content provided from each URL bookmarked for each account, and
    wherein the metadata related to the specific content corresponding to the bookmarked URL comprises a URL, title information, thumbnail, description, a publisher, posted date and time, a category, a service provider, play time and a screenshot,
    wherein the processor is further configured to:
    based on a bookmark request for a URL providing a specific content being received, store the bookmarked URL and metadata related to the specific content corresponding to the bookmarked URL in the storage,
    based on the response signal not being received from the accessed first URL, identify that the first content corresponding to the first URL is unable to be provided from the first URL,
    based on information regarding the first content being not included in the response signal, identify that the first content corresponding to the first URL is unable to be provided from the first URL,
    based on the information regarding the first content being not included in the source code, identify that the first content corresponding to the first URL is unable to be provided from the first URL,
    based on the first content corresponding to the first URL being unable to be provided from the first URL, compare metadata related to the first content corresponding to the first URL with metadata related to a content provided from a URL bookmarked on an account of another user, and obtain the information regarding the second URL according to the comparison.

2. The device according to claim 1, wherein the communicator communicates with an external server providing a search service using a search engine, and
    wherein the processor is further configured to, based on the first content corresponding to the first URL being unable to be provided from the first URL, receive the information regarding the second URL searched based on metadata related to the first content corresponding to the first URL from the external server.

3. A method for controlling an electronic device, the method comprising:
    storing a plurality of uniform resource locators (URLs) designated on an external electronic device and information regarding at least one of specific contents provided from each of the designated URLs;
    based on an access request for a first URL providing a first content among the designated URLs being received from an external electronic device, accessing the first URL and identifying whether or not the first content corresponding to the first URL is able to be provided from the first URL based on a response signal according to the access or a source code provided from the accessed first URL;
    based on the first content corresponding to the first URL being unable to be provided, obtaining information regarding second URL providing a content related to the first content corresponding to the first URL using the stored information; and
    transmitting the obtained information regarding the second URL to the external electronic device such that the external electronic device obtains the first content based on the second URL
    wherein the storing comprises:
    storing a URL bookmarked for each account of a plurality of users and metadata related to a specific content provided from each URL bookmarked for each account,
    wherein the metadata related to the specific content corresponding to the bookmarked URL comprises a URL, title information, thumbnail, description, a publisher, posted date and time, a category, a service provider, play time and a screenshot,
    wherein the storing comprises:
    based on a bookmark request for a URL providing a specific content being received, storing the bookmarked URL and metadata related to the specific content corresponding to the bookmarked URL in the storage, wherein the identifying comprises:
based on the response signal not being received from the accessed first URL, identifying that the first content corresponding to the first URL is unable to be provided from the first URL,
based on information regarding the first content being not included in the response signal, identifying that the first content corresponding to the first URL is unable to be provided from the first URL,
based on the information regarding the first content being not included in the source code, identifying that the first content corresponding to the first URL is unable to be provided from the first URL,
wherein the obtaining comprises:
based on the first content corresponding to the first URL being unable to be provided from the first URL, comparing metadata related to the first content corresponding to the first URL with metadata related to a content provided from a URL bookmarked on an account of another user, and obtain the information regarding the second URL according to the comparison.

4. The method according to claim 3, wherein the obtaining comprises, based on the first content corresponding to the first URL being unable to be provided from the first URL, receiving the information regarding the second URL searched based on metadata related to the first content corresponding to the first URL from the external server providing a search service using a search engine.

* * * * *